US012619749B2

(12) United States Patent
Castinado et al.

(10) Patent No.: US 12,619,749 B2
(45) Date of Patent: *May 5, 2026

(54) SYSTEM FOR IMAGE/VIDEO AUTHENTICITY VERIFICATION

(71) Applicant: BANK OF AMERICA CORPORATION, Charlotte, NC (US)

(72) Inventors: Joseph Benjamin Castinado, North Glenn, CO (US); Naoll Addisu Merdassa, Chakopee, MN (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 72 days.

This patent is subject to a terminal disclaimer.

(21) Appl. No.: 18/802,015

(22) Filed: Aug. 13, 2024

(65) Prior Publication Data

US 2024/0403460 A1     Dec. 5, 2024

Related U.S. Application Data

(63) Continuation of application No. 17/343,103, filed on Jun. 9, 2021, now Pat. No. 12,099,618.

(51) Int. Cl.
  *G06F 21/62*      (2013.01)
  *G06N 20/00*      (2019.01)
  *G06T 7/00*       (2017.01)

(52) U.S. Cl.
  CPC ......... *G06F 21/6209* (2013.01); *G06N 20/00* (2019.01); *G06T 7/0002* (2013.01); *G06T 2207/20081* (2013.01)

(58) Field of Classification Search
  CPC ... G06F 21/6209; G06N 20/00; G06T 7/0002; G06T 2207/20081
  See application file for complete search history.

(56) References Cited

U.S. PATENT DOCUMENTS

| | | | |
|---|---|---|---|
| 7,024,033 B2 | 4/2006 | Li et al. | |
| 8,015,132 B2 | 9/2011 | Xu | |
| 8,259,806 B2 | 9/2012 | Radhakrishnan et al. | |
| 8,467,611 B2 | 6/2013 | Kumar et al. | |
| 8,799,122 B1 | 8/2014 | Del Favero et al. | |
| 9,082,235 B2 | 7/2015 | Lau et al. | |
| 9,794,260 B2 | 10/2017 | Loughlin-Mchugh et al. | |
| 10,417,501 B2 | 9/2019 | Ashour et al. | |
| 10,546,183 B2 | 1/2020 | Rodriguez et al. | |

(Continued)

OTHER PUBLICATIONS

Ma et al., Understanding Adversarial Attacks on Deep Learning Based Medical Image Analysis Systems, Pattern Recognition 110 2021): 107332 (Year: 2021).

*Primary Examiner* — Luu T Pham
*Assistant Examiner* — Paul J Skwierawski
(74) *Attorney, Agent, or Firm* — Moore & Van Allen PLLC; Nicholas C. Russell

(57) ABSTRACT

Embodiments of the invention are directed to systems, methods, and computer program products for intelligent verification of digital files via the analysis of metadata and other file characteristics. The system is adaptive, in that it can be adjusted based on the needs or goals of the user utilizing it, or may intelligently and proactively adapt based on the files or data received for processing. The system may be seamlessly embedded within existing applications or programs that the user may already use to interact with one or more entities.

15 Claims, 5 Drawing Sheets

(56)  References Cited

U.S. PATENT DOCUMENTS

| | | | |
|---|---|---|---|
| 10,614,289 B2 | 4/2020 | Senechal et al. | |
| 10,747,837 B2 | 8/2020 | Goldenstein et al. | |
| 10,964,006 B2 * | 3/2021 | Nießner | G06V 10/462 |
| 11,023,618 B2 | 6/2021 | Berman | |
| 11,586,724 B1 * | 2/2023 | Gallagher | H04L 9/3239 |
| 2017/0105668 A1 | 4/2017 | El Kaliouby et al. | |
| 2019/0164173 A1 | 5/2019 | Liu et al. | |
| 2020/0145436 A1 | 5/2020 | Brown et al. | |
| 2020/0285683 A1 | 9/2020 | David | |
| 2020/0387602 A1 * | 12/2020 | Kursun | G06F 21/554 |
| 2020/0411167 A1 | 12/2020 | Kearney et al. | |
| 2021/0142065 A1 | 5/2021 | Price et al. | |
| 2021/0194699 A1 | 6/2021 | Tatonetti et al. | |
| 2021/0209230 A1 | 7/2021 | Leitner et al. | |
| 2022/0342962 A1 | 10/2022 | Gallagher et al. | |

* cited by examiner

USER DEVICE 104

COMMUNICATION DEVICE
360

PROCESSING DEVICE
310

POSITIONING SYSTEM DEVICE
320

USER INPUT DEVICES (E.G. MICROPHONE, KEYPAD, TOUCHPAD, AND THE LIKE)
330

USER OUTPUT DEVICES (E.G. DISPLAY, SPEAKER, AND THE LIKE)
340

MEMORY 350

USER APPLICATION
351

ENTITY APPLICATION
352

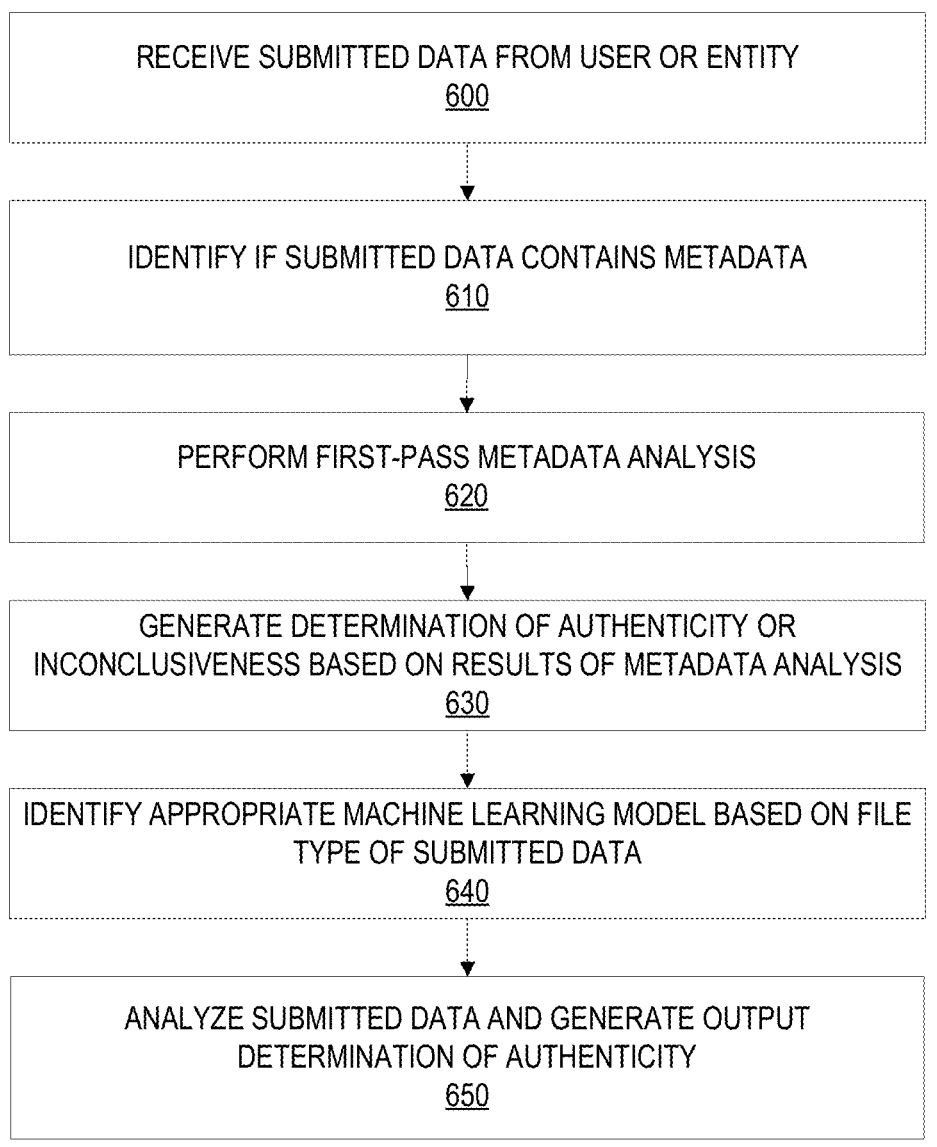

RECEIVE SUBMITTED DATA FROM USER OR ENTITY
600

IDENTIFY IF SUBMITTED DATA CONTAINS METADATA
610

PERFORM FIRST-PASS METADATA ANALYSIS
620

GENERATE DETERMINATION OF AUTHENTICITY OR
INCONCLUSIVENESS BASED ON RESULTS OF METADATA ANALYSIS
630

IDENTIFY APPROPRIATE MACHINE LEARNING MODEL BASED ON FILE
TYPE OF SUBMITTED DATA
640

ANALYZE SUBMITTED DATA AND GENERATE OUTPUT
DETERMINATION OF AUTHENTICITY
650

*Figure 4*

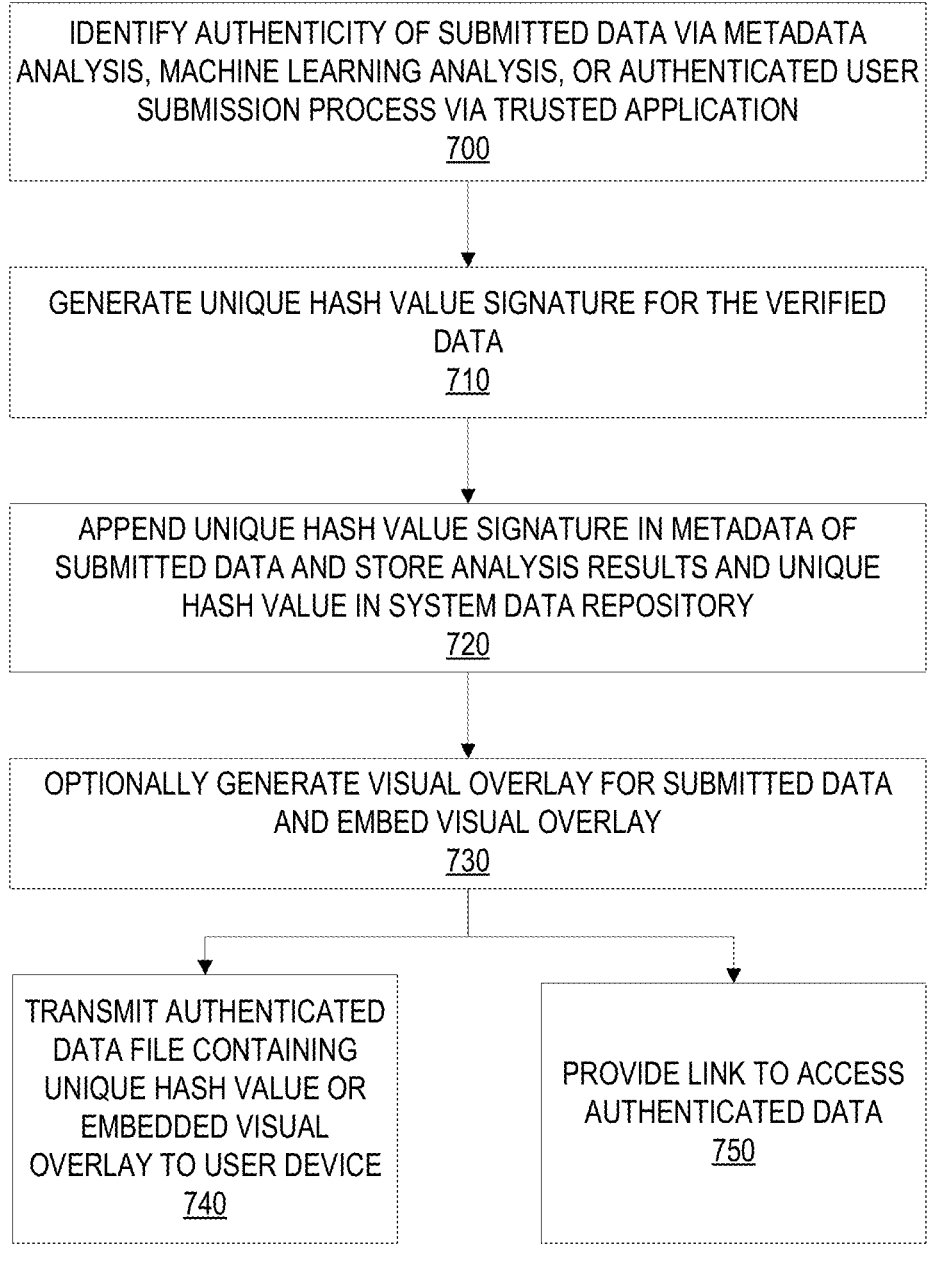

IDENTIFY AUTHENTICITY OF SUBMITTED DATA VIA METADATA ANALYSIS, MACHINE LEARNING ANALYSIS, OR AUTHENTICATED USER SUBMISSION PROCESS VIA TRUSTED APPLICATION
700

GENERATE UNIQUE HASH VALUE SIGNATURE FOR THE VERIFIED DATA
710

APPEND UNIQUE HASH VALUE SIGNATURE IN METADATA OF SUBMITTED DATA AND STORE ANALYSIS RESULTS AND UNIQUE HASH VALUE IN SYSTEM DATA REPOSITORY
720

OPTIONALLY GENERATE VISUAL OVERLAY FOR SUBMITTED DATA AND EMBED VISUAL OVERLAY
730

TRANSMIT AUTHENTICATED DATA FILE CONTAINING UNIQUE HASH VALUE OR EMBEDDED VISUAL OVERLAY TO USER DEVICE
740

PROVIDE LINK TO ACCESS AUTHENTICATED DATA
750

*Figure 5*

SYSTEM FOR IMAGE/VIDEO AUTHENTICITY VERIFICATION

CROSS-REFERENCE TO RELATED APPLICATION

The present application claims priority to and is a continuation of U.S. patent application Ser. No. 17/343,103 filed Jun. 9, 2021, and of the same title; the contents of which are also incorporated herein by reference.

BACKGROUND

Given increased access to personal computing devices with requisite processing power, the advent of inauthentic imagery and audio is becoming more prevalent. For instance, it is possible for a consumer level device to execute an algorithm which can convincingly emulate the voice, likeness, or image of a human user without that user's knowledge, or without the viewer's awareness. As such, there is a need for systems and methods to identify and prevent inauthentic works, as well as quickly and easily convey a trusted visual indication of authenticity.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The systems and methods described herein address the above needs by providing intelligent system and methods for identifying inauthentic works and providing a trusted source of verified authentic works. The system is adaptive, in that it can be adjusted based on the needs or goals of the user utilizing it, or may intelligently and proactively adapt based on the files or data received for processing. The system may be seamlessly embedded within existing applications or programs that the user may already use to interact with one or more entities, particularly those which aid in the managing of user resources. For instance, the system may be offered as an additional service or feature in an existing mobile application hosted by a trusted entity, or the like. The system may utilize various information in order to intelligently generate feedback regarding the authenticity of submitted works or data. Additionally, previously submitted works may be indicated by the system as authentic in a manner that the user can quickly and easily visually verify.

Embodiments of the invention relate to systems, methods, and computer program products for image and video authenticity verification, the invention generally comprising at least one non-transitory storage device; and at least one processing device coupled to the at least one non-transitory storage device, wherein the at least one processing device is configured to: receive a submitted data file from a user device or entity system; identify if the submitted data file contains associated metadata; perform a first-pass metadata analysis and determine if the associated metadata of the submitted data file corroborates one or more known attributes of the submitted data file; generate an initial determination of authentic or inconclusive based on the first-pass metadata analysis; if the initial determination is inconclusive, identify one or more machine learning models of a machine learning dataset based on a file type of the submitted data file; and perform one or more pattern recognition processes on the submitted data file via the identified one or more machine learning models; and generate a determination of authenticity or inauthenticity of the submitted data file based on results of the one or more pattern recognition processes.

In some embodiments, the submitted data file may be a video file or an image file.

In some embodiments, the associated metadata further comprises exchangeable image file (EXIF) data.

In some embodiments, the invention is further configured to: generate a unique hash value for the submitted data file based on determining authenticity of the submitted data file; append the unique hash value to the metadata of the submitted data file; and transmit a notification of authenticity of the submitted data file to the user device.

In some embodiments, the invention is further configured to: upload the submitted data file to a remotely accessible datastore based on determining authenticity of the submitted data file; and transmit a link to the submitted data file to the user device.

In some embodiments, the invention is further configured to: overlay a visual logo on the data file based on determining authenticity of the submitted data file, generating a visually authenticated data file; and transmit the visually authenticated data file to the user device.

In some embodiments, the invention is further configured to: receive the submitted data file via a secure user application on the user device; and based on receiving one or more user security verifications contemporaneous with creation of the submitted data file, automatically verify the submitted data file as authentic.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
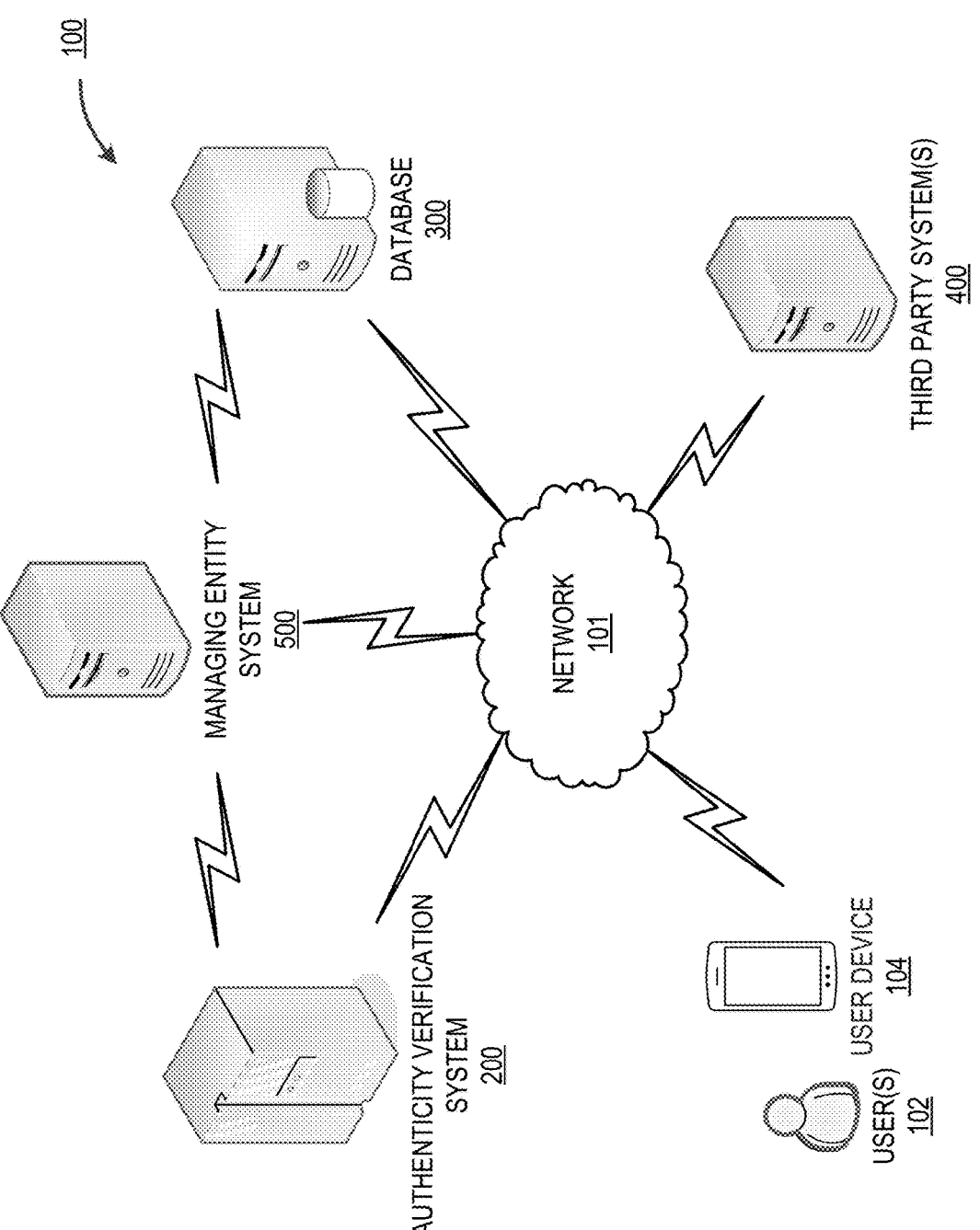
Figure 2:
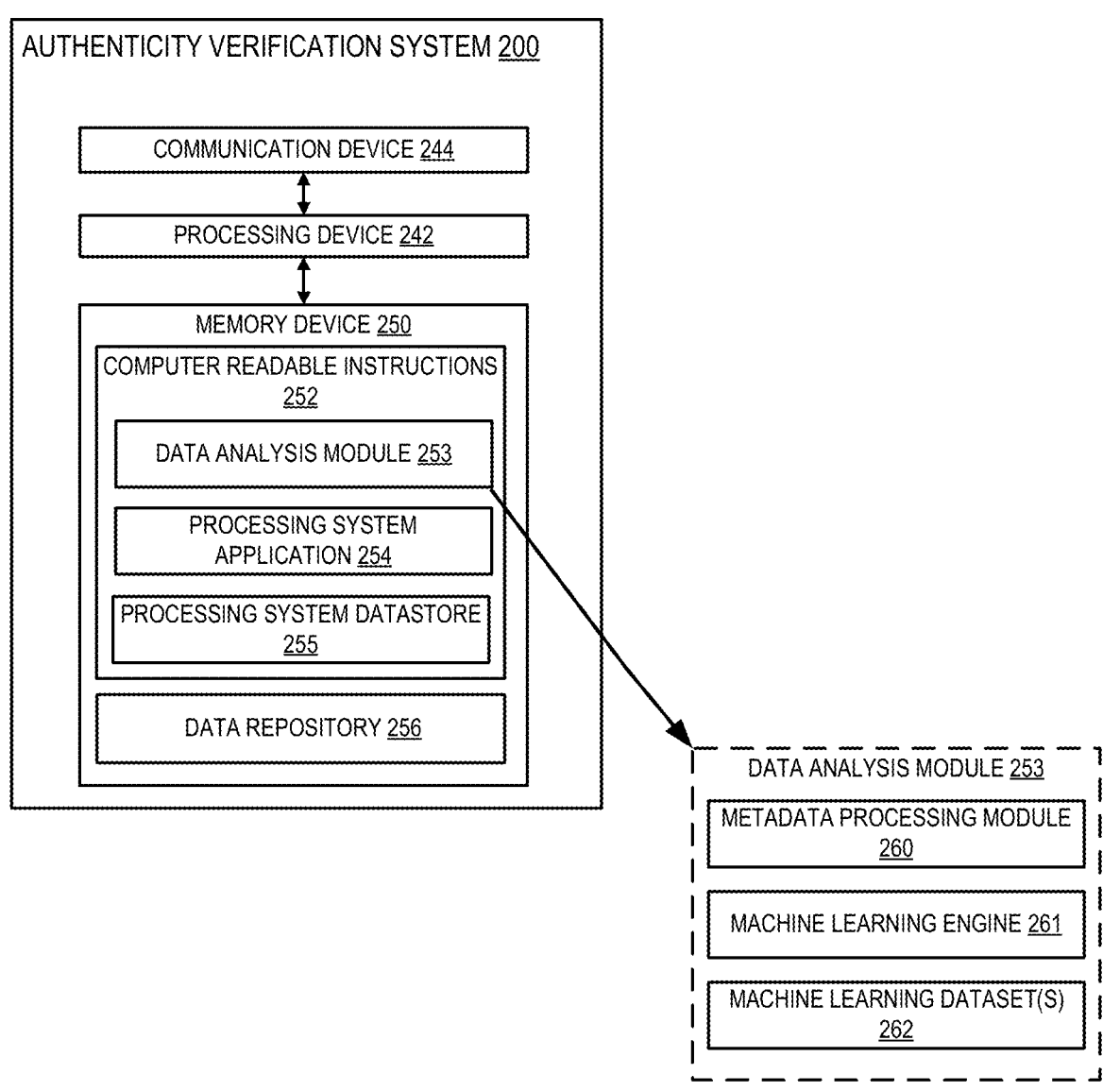
Figure 3:
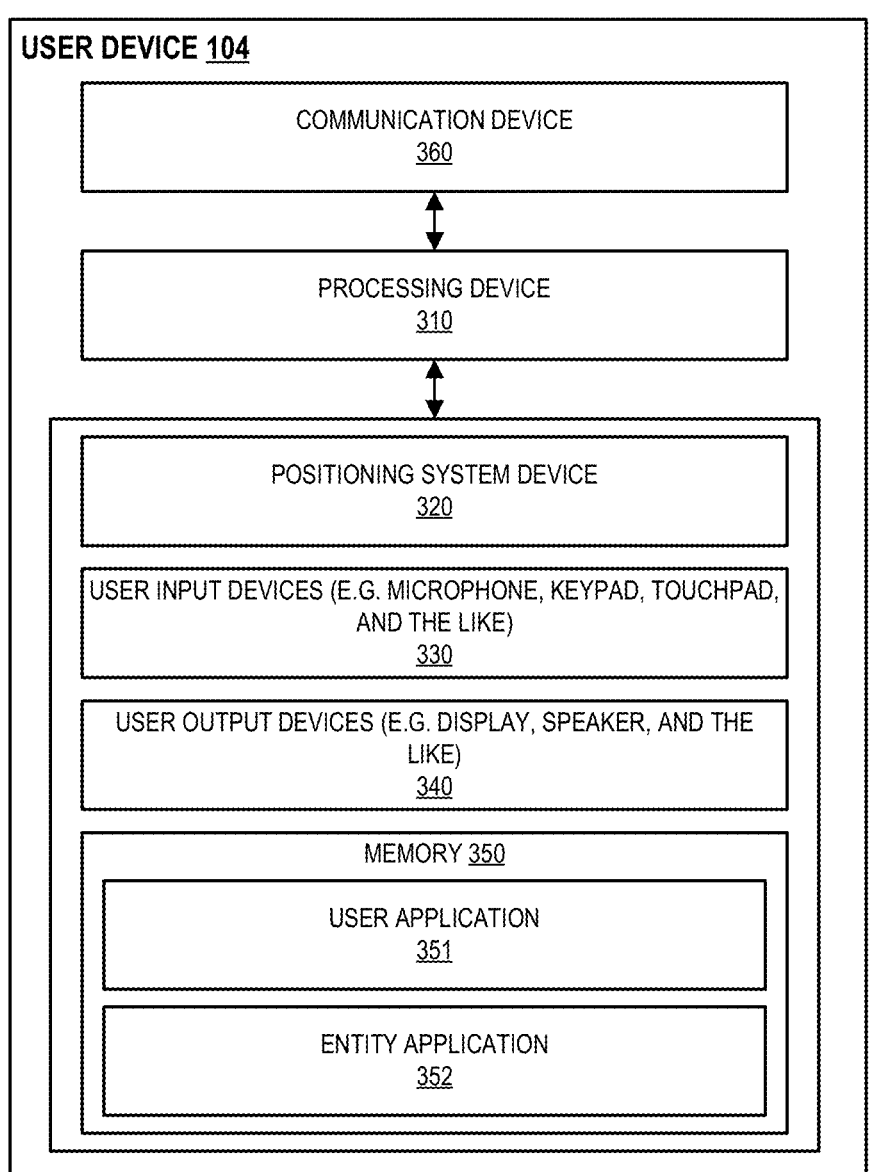

Having thus described embodiments of the invention in general terms, reference will now be made to the accompanying drawings, wherein:

FIG. 1 illustrates an operating environment for the authenticity verification system, in accordance with one embodiment of the present disclosure;

FIG. 2 is a block diagram illustrating the components of the authenticity verification system, in accordance with one embodiment of the present disclosure;

FIG. 3 is a block diagram illustrating a user device associated with the authenticity verification system, in accordance with one embodiment of the present disclosure;

FIG. 4 is a flow diagram illustrating a process of receiving and analyzing submitted data, in accordance with one embodiment of the present disclosure; and FIG. 5 is a flow diagram illustrating a process for generating a visual identification of authenticity, in accordance with one embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" or "managing entity" as used herein may refer to any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, or the like. The account is associated with and/or maintained by the entity. In other embodiments, an entity may not be a financial institution. In still other embodiments, the entity may be the merchant itself.

"Entity system" or "managing entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"User" as used herein may refer to an individual associated with an entity. As such, in some embodiments, the user may be an individual having past relationships, current relationships or potential future relationships with an entity. In some instances, a "user" is an individual who has a relationship with the entity, such as a customer or a prospective customer. Accordingly, as used herein the term "user device" or "mobile device" may refer to mobile phones, personal computing devices, tablet computers, wearable devices, and/or any portable electronic device capable of receiving and/or storing data therein and are owned, operated, or managed by a user.

"Transaction," "resource activity," or "resource transfer" as used herein may refer to any communication between a user and a third party merchant or individual to transfer funds for purchasing or selling of a product. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

The system allows for use of a machine learning engine to intelligently identify patterns in received resource transaction data as potentially malfeasant. The machine learning engine may be used to analyze historical data in comparison to real-time received transaction data in order to identify malfeasant transactions. The machine learning engine may also be used to generate intelligent aggregation of similar data based on metadata comparison resource transaction characteristics, which in some cases may be used to generate a database visualization of identified patterns similarities.

FIG. 1 illustrates an operating environment for the authenticity verification system, in accordance with one embodiment of the present disclosure. As illustrated, the operating environment 100 may comprise a user 102 and/or a user device 104 in operative communication with one or more third party systems 400 (e.g., web site hosts, registry systems, financial entities, third party entity systems, or the like). The operative communication may occur via a network 101 as depicted, or the user 102 may be physically present at a location separate from the various systems described, utilizing the systems remotely. The operating environment also includes a managing entity system 500, authenticity verification system 200, a database 300, and/or other systems/devices not illustrated herein and connected via a network 101. As such, the user 102 may request information from or utilize the services of the authenticity verification system 200, or the third party system 400 by establishing operative communication channels between the user device 104, the managing entity system 500, and the third party system 400 via a network 101.

Typically, the authenticity verification system 200 and the database 300 are in operative communication with the managing entity system 500, via the network 101, which may be the internet, an intranet or the like. In FIG. 1, the network 101 may include a local area network (LAN), a wide area network (WAN), a global area network (GAN), and/or near field communication (NFC) network. The network 101 may provide for wireline, wireless, or a combination of wireline and wireless communication between devices in the network. In some embodiments, the network 101 includes the Internet. In some embodiments, the network 101 may include a wireless telephone network. Furthermore, the network 101 may comprise wireless communication networks to establish wireless communication channels such as a contactless communication channel and a near field communication (NFC) channel (for example, in the instances where communication channels are established between the user device 104 and the third party system 400). In this regard, the wireless communication channel may further comprise near field communication (NFC), communication via radio waves, communication through the internet, communication via electromagnetic waves and the like.

The user device 104 may comprise a mobile communication device, such as a cellular telecommunications device (e.g., a smart phone or mobile phone, or the like), a computing device such as a laptop computer, a personal digital assistant (PDA), a mobile internet accessing device, or other mobile device including, but not limited to portable digital assistants (PDAs), pagers, mobile televisions, laptop computers, cameras, video recorders, audio/video player, radio, GPS devices, any combination of the aforementioned, or the like. The user device is described in greater detail with respect to FIG. 3.

The managing entity system 500 may comprise a communication module and memory not illustrated, and may be configured to establish operative communication channels with a third party system 400 and/or a user device 104 via a network 101. The managing entity may comprise a data repository 256. The data repository 256 may contain resource account data, and may also contain user data. This user data may be used by the managing entity to authorize or validate the identity of the user 102 for accessing the system (e.g., via a username, password, biometric security mechanism, two-factor authentication mechanism, or the like). In some embodiments, the managing entity system is in operative communication with the authenticity verification system 200 and database 300 via a private communication channel. The private communication channel may be via a network 101 or the authenticity verification system 200 and database 300 may be fully integrated within the managing entity system 500, such as a virtual private network (VPN), or over a secure socket layer (SSL).

The managing entity system 500 may communicate with the authenticity verification system 200 in order to transmit data by or via a plurality of third party systems 400. In some embodiments, the managing entity may utilize the features and functions of the authenticity verification system 200 to provide an objective verification of the authentic nature of certain data. In other embodiments, the managing entity and/or the one or more third party systems may utilize the authenticity verification system 200 to process and analyze submitted data to identify inauthentic works.

FIG. 2 illustrates a block diagram of the authenticity verification system 200 associated with the operating environment 100, in accordance with embodiments of the present invention. As illustrated in FIG. 2, the authenticity verification system 200 may include a communication device 244, a processing device 242, and a memory device 250 having a data analysis module 253, a processing system application 254 and a processing system datastore 255 stored therein. As shown, the processing device 242 is operatively connected to and is configured to control and cause the communication device 244, and the memory device 250 to perform one or more functions. In some embodiments, the data analysis module 253 and/or the processing system application 254 comprises computer readable instructions that when executed by the processing device 242 cause the processing device 242 to perform one or more functions and/or transmit control instructions to the database 300, the managing entity system 500, or the communication device 244. It will be understood that the data analysis module 253 or the processing system application 254 may be executable to initiate, perform, complete, and/or facilitate one or more portions of any embodiments described and/or contemplated herein. The data analysis module 253 may comprise executable instructions associated with data processing and analysis and may be embodied within the processing system application 254 in some instances. The authenticity verification system 200 may be owned by, operated by and/or affiliated with the same managing entity that owns or operates the managing entity system 500. In some embodiments, the authenticity verification system 200 is fully integrated within the managing entity system 500.

The data analysis module 253 may further comprise a metadata processing module 260, a machine learning engine 261, and a machine learning dataset(s) 262. The metadata processing module 260 may store instructions and/or data that may cause or enable the authenticity verification system 200 to receive, store, and/or analyze metadata of files received by the managing entity system 500 or the database 300, as well as generate information and transmit responsive data to the managing entity system 500 in response to one or more requests or via a real-time data stream between the authenticity verification system 200 and the managing entity system 500. The metadata processing module 260 may process incoming data as a first pass filter to identify if data needs to be fed to the machine learning engine 261 for authenticity verification. For instance, in some embodiments, the metadata processing module 260 may receive one or more data files containing metadata which identifies the files as originating from a specific source, being generated at a specific location, on a specific device, or the like, and may make a determination based on this metadata that the data is authentic. For instance, the system may analyze exchangeable image file format (.EXIF) data of one or more images to determine where and when the image was taken, what model of camera was used, or the like, to verify that the image was generated at a certain time or place, or by a certain camera or person, and may corroborate this data with the visual contents of the image itself, or one or more descriptions available from a user or third party system (e.g., a user may submit an image which is purported to show an event, and the system may independently source information regarding the time and place of the event in order to correlate this information with the metadata of the image). In other embodiments, the metadata processing module 260 may recognize a complete or partial lack of metadata information associated with an image, which may indicate that the metadata has been stripped. While stripping of metadata may be done for legitimate purposes and may not be dispositive as to authenticity, this fact may be noted by the system in the data repository 256 as a potential reason to infer that the data has been tampered with or may not be authentic, or at least determine that the data requires further review due to the metadata analysis being inconclusive. In still further embodiments, the metadata of the received data files may contain one or more hash values which have been previously generated by the system and which can be decoded and authenticated against data stored in the data repository 256. In this way, the system may actually embed authenticity verification metadata within previously verified images in order to quickly corroborate that the image has not been tampered with in any way beyond its initial creation, both by decoding the hash value and also analyzing the general data characteristics of the submitted data to ensure that the file size, pixel content, or the like matches the stored characteristics of the verified data that were noted by the system at a previous time during the creation of the unique hash value.

In some embodiments, the metadata processing module 260 may forward submitted data to be analyzed by the machine learning engine 261, as well as store the files in a catalog of data files in the data repository 256 or database 300 (e.g., files may be catalogued according to any metadata characteristic, including descriptive characteristics such as source, identity persons depicted, geographic location, generated unique hash value, or the like, or including data characteristics such as file type, size, sample rate, frequency patterns, length, or the like). The machine learning engine 261 and machine learning dataset(s) 262 may store instructions and/or data which allow the system to identify indications that certain file types have been tampered with beyond their initial creation. The approach to this analysis and determination may differ based on the file type submitted; however, the general approach of using a neural network trained to identify inauthentic characteristics may be the same. For instance, the machine learning engine 261 may contain one or more neural network models, such as a convolutional neural network (CNN) trained to identify certain data characteristics, such as image boundaries, pixel boundaries, abrupt coloration changes, image data discontinuity (e.g., blurry areas of an image or certain distinct areas where color palettes or pixel densities do not match, or the like). In other embodiments, the machine learning engine 261 may contain one or more neural network models such as a CNN trained to identify certain data characteristics such as dropped or missing frames in a video file, or the like. In still further embodiments, the machine learning engine 261 may contain one or more recurrent neural network RNN models trained to identify certain data characteristics of audio files which appear to show artificial or engineered audio, such as abrupt changes in pitch, tone, or other identifiable frequency patterns.

In some embodiments, the machine learning engine 261 may verify the authenticity of one or more submitted data files, and may generate a unique hash value (e.g., by combining output from a random or pseudo-random number generator with some combination of data or metadata from the submitted data file itself, or the like, and encrypting the combination of the output and data), and store this unique hash value in the metadata of the submitted data file, embed the hash value in the submitted data file in an encrypted manner, or the like. Data containing the encryption characteristics and decryption characteristics of the unique hash value may be further encrypted and stored in the data repository 256 for later reference. In some embodiments, in addition to, or in place of, creating and embedding the unique hash value, the system may overlay a distinctive visual identification on the submitted data file itself (e.g., in instances where the submitted data is an image or video, the system may overlay a small logo on the image or video to indicate its authenticity, such as a checkmark, entity logo, or other visual cue).

The machine learning engine 261 may receive data from a plurality of sources and, using one or more machine learning algorithms, may generate one or more machine learning datasets 262. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. It is understood that additional or alternative machine learning algorithms may be used without departing from the invention.

The communication device 244 may generally include a modem, server, transceiver, and/or other devices for communicating with other devices on the network 101. The communication device 244 may be a communication interface having one or more communication devices configured to communicate with one or more other devices on the network 101, such as the authenticity verification system 200, the user device 104, other processing systems, data systems, etc.

Additionally, referring to authenticity verification system 200 illustrated in FIG. 2, the processing device 242 may generally refer to a device or combination of devices having circuitry used for implementing the communication and/or logic functions of the authenticity verification system 200. For example, the processing device 242 may include a control unit, a digital signal processor device, a microprocessor device, and various analog-to-digital converters, digital-to-analog converters, and other support circuits and/or combinations of the foregoing. Control and signal processing functions of the authenticity verification system 200 may be allocated between these processing devices according to their respective capabilities. The processing device 242 may further include functionality to operate one or more software programs based on computer-executable program code 252 thereof, which may be stored in a memory device 250, such as the processing system application 254 and the data analysis module 253. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device 242 may be configured to use the network communication interface of the communication device 244 to transmit and/or receive data and/or commands to and/or from the other devices/systems connected to the network 101.

The memory device 250 within the authenticity verification system 200 may generally refer to a device or combination of devices that store one or more forms of computer-readable media for storing data and/or computer-executable program code/instructions. For example, the memory device 250 may include any computer memory that provides an actual or virtual space to temporarily or permanently store data and/or commands provided to the processing device 242 when it carries out its functions described herein.

FIG. 3 is a block diagram illustrating a user device associated with the expedited resource transaction issue notification and response system. The user device 104 may include a user mobile device or the like. A "mobile device" 104 may be any mobile communication device, such as a cellular telecommunications device (i.e., a cell phone or mobile phone), personal digital assistant (PDA), a mobile Internet accessing device, or another mobile device including, but not limited to portable digital assistants (PDAs), pagers, mobile televisions, laptop computers, cameras, video recorders, audio/video player, radio, GPS devices, any combination of the aforementioned devices.

The user device 104 may generally include a processing device or processor 310 communicably coupled to devices such as, a memory device 350, user output devices 340 (for example, a user display or a speaker), user input devices 330 (such as a microphone, keypad, touchpad, touch screen, and the like), a communication device or network interface device 360, a positioning system device 320, such as a geo-positioning system device like a GPS device, an accelerometer, and the like, one or more chips, and the like.

The processor 310 may include functionality to operate one or more software programs or applications, which may be stored in the memory device 350. For example, the processor 310 may be capable of operating applications such as a user application 351, an entity application 352, or a web browser application. The user application 351 or the entity application may then allow the user device 104 to transmit and receive data and instructions to or from the third party system 400, authenticity verification system 200, and the managing entity system 500, and display received information via the user interface of the user device 104. The user application 351 may further allow the user device 104 to transmit and receive data to or from the managing entity system 500 (for example, via wireless communication or NFC channels), data and instructions to or from the authenticity verification system 200, web content, such as, for example, location-based content and/or other web page content, according to a Wireless Application Protocol (WAP), Hypertext Transfer Protocol (HTTP), and/or the like. The user application 351 may allow the managing entity system 500 to present the user 102 with a plurality of recommendations, identified trends, suggestions, transaction data, pattern data, graph data, statistics, and/or the like for the user to review. In some embodiments, the user interface displayed via the user application 351 or entity application 352 may be entity specific. For instance, while the authenticity verification system 200 may be accessed by multiple different entities, it may be configured to present information according to the preferences or overall common themes or branding of each entity system of third party system. In this way, each system accessing the authenticity verification system 200 may use a unique aesthetic for the entity application 352 or user application 351 portal, but all entities may access the same information, given that they are permitted by the managing entity system 500.

In some embodiments, the entity application 352 or user application 351 may present the user with the option to directly upload image data, video data, or audio file data generated in real-time by the user device 104. The entity application 352 or user application 351 may request one or more user device identifiers from the user device 104, such as a hardware identification number, IP address, or the like, or may request the user to enter certain verification information such as a user passcode, biometric authentication information, or the like. In some embodiments, the entity application 352 or user application 351 may leverage the biometric authentication capabilities of the user device itself (e.g., the user may authorize the user device to authenticate the user by means of a local security chip on the user device 104 in any number of manners, such as facial or fingerprint recognition, device passcode or the like, and transmit a security certificate to the authenticity verification system 200). The user may then allow the entity application 352 or user application 351 to access data from the camera or microphone of the user device 104, and contemporaneously record audio or visual information which is directly input to the entity application 352 or user application 351 and transmitted to the authenticity verification system 200. The authenticity verification system 200 may receive the data in near-real-time, and in conjunction with the user authentication data, or by corroborating the metadata of the produced audio or visual data with the device identifier data, may validate the authenticity of the received data and log this in the data repository 256 for later reference. In some embodiments, the authenticity verification system 200 may process the received data in order to include a unique hash value or visual identifier as discussed with regard to FIG. 2, and either transmit the processed data file back to the user device or provide a link to the verified data file via the user application 351 or entity application 352.

The processor 310 may be configured to use the communication device 360 to communicate with one or more devices on a network 101 such as, but not limited to the third party system 400, the authenticity verification system 200, and the managing entity system 500. In this regard the processor 310 may be configured to provide signals to and receive signals from the communication device 360. The signals may include signaling information in accordance with the air interface standard of the applicable BLE standard, cellular system of the wireless telephone network and the like, that may be part of the network 101. In this regard, the user device 104 may be configured to operate with one or more air interface standards, communication protocols, modulation types, and access types. By way of illustration, the user device 104 may be configured to operate in accordance with any of a number of first, second, third, and/or fourth-generation communication protocols and/or the like. For example, the user device 104 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user device 104 may also be configured to operate in accordance with non-cellular communication mechanisms, such as via a wireless local area network (WLAN) or other communication/data networks. The user device 104 may also be configured to operate in accordance Bluetooth® low energy, audio frequency, ultrasound frequency, or other communication/data networks.

The communication device 360 may also include a user activity interface presented in user output devices 340 in order to allow a user 102 to execute some or all of the processes described herein. The application interface may have the ability to connect to and communicate with an external data storage on a separate system within the network 101. The user output devices 340 may include a display (e.g., a liquid crystal display (LCD) or the like) and a speaker or other audio device, which are operatively coupled to the processor 310 and allow the user device to output generated audio received from the authenticity verification system 200. The user input devices 330, which may allow the user device 104 to receive data from the user 102, may include any of a number of devices allowing the user device 104 to receive data from a user 102, such as a keypad, keyboard, touch-screen, touchpad, microphone, mouse, joystick, other pointer device, button, soft key, and/or other input device(s).

The user device 104 may also include a memory buffer, cache memory or temporary memory device 350 operatively coupled to the processor 310. Typically, one or more applications 351 and 352, are loaded into the temporarily memory during use. As used herein, memory may include any computer readable medium configured to store data, code, or other information. The memory device 350 may include volatile memory, such as volatile Random Access Memory (RAM) including a cache area for the temporary storage of data. The memory device 420 may also include non-volatile memory, which can be embedded and/or may be removable. The non-volatile memory may additionally or alternatively include an electrically erasable programmable read-only memory (EEPROM), flash memory or the like.

In some instances, various features and functions of the invention are described herein with respect to a "system." In some instances, the system may refer to the authenticity verification system 200 performing one or more steps described herein in conjunction with other devices and systems, either automatically based on executing computer readable instructions of the memory device 250, or in response to receiving control instructions from the managing entity system 500. In some instances, the system refers to the devices and systems on the operating environment 100 of FIG. 1. The features and functions of various embodiments of the invention are be described below in further detail.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 4 is a flow diagram illustrating a process of receiving and analyzing submitted data, in accordance with one embodiment of the present disclosure. As shown in block 600, the process begins whereby the authenticity verification system 200 receives submitted data, either from device such as the user device 104, or other entity system such as third party entity system 400. The authenticity verification system 200 then proceeds to step 610, wherein the system determines what, if any, metadata is associated with the submitted data. The system may then determine if the metadata might be relevant the submitted data's veracity or authenticity, as indicated by step 620 wherein the authenticity verification system 200 performs a first-pass metadata analysis. In doing so, the system is able to generate a determination of authenticity or inconclusiveness based on the results of the metadata analysis, as shown in block 630. The metadata processing module 260 may process incoming data as a first-pass filter to identify if data needs to be fed to the machine learning engine 261 for authenticity verification. For instance, in some embodiments, the metadata processing module 260 may receive one or more data files containing metadata which identify the files as originating from a specific source, being generated at a specific location, on a specific device, or the like, and may make a determination based on this metadata that the submitted data is authentic. For instance, the system may analyze the .EXIF data of one or more images to determine where and when the image was taken, what model of camera was used, or the like, to verify that the image was generated at a certain time or place, or by a certain camera or person, and may corroborate this data with the visual contents of the image itself, or one or more descriptions available from a user or third party system (e.g., a user may submit an image which is purported to show an event, and the system may independently source information regarding the time and place of the event in order to correlate this information with the metadata of the image). In other embodiments, the metadata processing module 260 may recognize a complete or partial lack of metadata information associated with an image, which may indicate that the metadata has been stripped. While stripping of metadata may be done for legitimate purposes and may not be dispositive as to authenticity, this fact may be noted by the system in the data repository 256 as a potential reason to infer that the data has been tampered with or may not be authentic, or at least determine that the data requires further review due to the metadata analysis being inconclusive. In still further embodiments, the metadata of the received data files may contain one or more hash values which have been previously generated by the system and which can be decoded and authenticated against data stored in the data repository 256. In this way, the system may actually embed authenticity verification metadata within previously verified images in order to quickly corroborate that the image has not been tampered with, both by decoding the hash value and also analyzing the general data characteristics of the submitted data to ensure that the file size, pixel content, or the like matches the stored characteristics of the verified data that were noted by the system at the time of creation of the unique hash value.

In the event that the authenticity verification system 200 is unable to verify the authenticity of the submitted data based on the metadata analysis, the system may proceed to step 640, where the system identifies appropriate machine learning models for further analysis based on the file type of the submitted data. For instance, the authenticity verification system 200 may store multiple machine learning datasets 262 designed to separately analyze video, imagery, audio, or the like, seeing as these types of data contain different emergent pattern characteristics which would indicate that they were synthetically altered in some way after their initial creation. Once the authenticity verification system 200 identifies the appropriate machine learning model for analysis, the authenticity verification system 200 may analyze the submitted data and generate an output determination of authenticity. In some embodiments, the output may be a binary determination of authentic or inauthentic. In other embodiments, the output may be a number of separate characteristics flagged by the authenticity verification system 200 as potentially indicating an inauthentic data point (e.g., the authenticity verification system 200 may extract portions of an image file, or otherwise indicate an area of an image file wherein the pixel data, coloration, or the like, appears to be non-uniform). In still further embodiments, the authenticity verification system 200 may generate a confidence score in terms of a percentage confidence that the submitted data is authentic or inauthentic (e.g., 100% confidence indicating a high degree of authenticity verification, while 0% would indicate a high confidence of inauthenticity, or the like). In some embodiments, the authenticity verification system 200 may rank generated output in a tiered fashion, wherein certain confidence ranges would correspond with a qualitative output (e.g., 0-30% would correspond to a qualitative output of "likely tampered with," 31-80% would correspond to a qualitative output of "cannot verify," and 81-100% would correspond to a qualitative output of "likely authentic," or the like).

FIG. 5 is a flow diagram illustrating a process for generating a visual identification of authenticity, in accordance with one embodiment of the present disclosure. The process begins at block 700, where the authenticity verification system 200 may identify authenticity of submitted data via metadata first-pass filter analysis, machine learning analysis, or via authenticated user submission process via a trusted application such as entity application 352 or user application 351 as previously described. Next, upon identifying the submitted data as authentic, as shown in block 710 the authenticity verification system 200 may generate a unique hash value signature for the verified data. In some embodiments, the machine learning engine 261 may verify the authenticity of one or more submitted data files, and may generate a unique hash value (e.g., by combining output from a random or pseudo-random number generator with some combination of data or metadata from the submitted data file itself, or the like, and encrypting the combination of the output and data), and store this unique hash value in the metadata of the submitted data file, embed the hash value in the submitted data file in an encrypted manner, or the like. Data containing the encryption characteristics and decryption characteristics of the unique hash value may be further encrypted and stored in the data repository 256 for later reference.

In some embodiments, in addition to, or in place of, creating and embedding the unique hash value, the system may overlay a distinctive visual identification on the submitted data file itself, as indicated by block 730. For example, in instances where the submitted data is an image or video, the system may overlay a small logo on the image or video to indicate its authenticity, such as a checkmark, entity logo, or other visual cue. Finally, as shown by blocks 740 and 750, the authenticity verification system 200 may transmit the authenticated data file containing the unique hash value or embedded visual overlay, or both, to the user device 104, or may also or conversely provide a link to access the authenticated data remotely by hosting the authenticated data on database 300, or the like, and providing access over network 101.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable program-mable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural program-ming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or soft-ware with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a tran-sitory or non-transitory computer-readable medium (e.g., a memory, and the like) that can direct a computer and/or other programmable data processing apparatus to function in a particular manner, such that the computer-executable pro-gram code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable appa-ratus provide operational steps to implement the steps speci-fied in the flowchart(s) and/or the functions specified in the block diagram block(s). Alternatively, computer-imple-mented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and sub-stitutions, in addition to those set forth in the above para-graphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for image and video authenticity verification, the system comprising:

at least one non-transitory storage device comprising computer-readable code; and at least one processing device coupled to the at least one non-transitory storage device, wherein the computer-readable code is configured to cause the at least one processing device to:

receive a submitted data file from a user device or entity system;

identify if the submitted data file contains associated metadata;

perform a first-pass metadata analysis and determine if the associated metadata of the submitted data file corroborates one or more known attributes of the submitted data file;

generate an initial determination of inconclusive based on the first-pass metadata analysis;

select one or more machine learning models of a machine learning dataset based on a file type of the submitted data file;

perform one or more pattern recognition processes on the submitted data file via the identified one or more machine learning models;

generate a determination of authenticity or inauthenticity of the submitted data file based on results of the one or more pattern recognition processes;

generate a unique hash value for the submitted data file based on determining authenticity of the submitted data file;

append the unique hash value to the metadata of the submitted data file;

receive the submitted data file via the secure user application on the user device;

based on receiving one or more user security verifications contemporaneous with creation of the submitted data file, automatically verify the submitted data file as authentic;

overlay a visual logo on the data file based on determining authenticity of the submitted data file, thereby generating a visually authenticated data file; and transmit the visually authenticated data file to the user device.

2. The system of claim 1, wherein the submitted data file is a video file or an image file.

3. The system of claim 1, wherein the associated metadata further comprises exchangeable image file (EXIF) data.

4. The system of claim 1, wherein generating a determination of the authenticity or inauthenticity of the submitted data file further comprises:

flagging characteristics in the submitted data file that indicate an inauthentic data point, comprising non-uniform pixel data or coloration;

generating a confidence score representing a percentage confidence of the authenticity or inauthenticity of the submitted data file; and based on the percentage confidence of the authenticity or inauthenticity, converting the percentage confidence to a qualitative output of likely tampered with, cannot verify, or likely authentic.

5. The system of claim 1, wherein the computer-readable code is further configured to cause the at least one processing device to:

upload the submitted data file to a remotely accessible datastore based on determining authenticity of the submitted data file; and transmit a link to the submitted data file to the user device.

6. A computer program product for image and video authenticity verification, the computer program product comprising at least one non-transitory computer-readable medium having computer-readable program code portions embodied therein, the computer-readable program code portions comprising:

an executable portion configured to receive a submitted data file from a user device or entity system;

an executable portion configured to identify if the submitted data file contains associated metadata;

an executable portion configured to perform a first-pass metadata analysis to determine if the associated metadata of the submitted data file corroborates one or more known attributes of the submitted data file;

an executable portion configured to generate an initial determination of inconclusive based on the first-pass metadata analysis;

an executable portion configured to select one or more machine learning models of a machine learning dataset based on a file type of the submitted data file;

an executable portion configured to perform one or more pattern recognition processes on the submitted data file via the identified one or more machine learning models;

an executable portion configured to generate a determination of authenticity or inauthenticity of the submitted data file based on results of the one or more pattern recognition processes;

an executable portion configured to generate a unique hash value for the submitted data file based on determining authenticity of the submitted data file;

an executable portion configured to append the unique hash value to the metadata of the submitted data file;

an executable portion configured to receive the submitted data file via the secure user application on the user device;

based on receiving one or more user security verifications contemporaneous with creation of the submitted data file, an executable portion configured to automatically verify the submitted data file as authentic;

an executable portion configured to overlay a visual logo on the data file based on determining authenticity of the submitted data file, thereby generating a visually authenticated data file; and an executable portion configured to transmit the visually authenticated data file to the user device.

7. The computer program product of claim 6, wherein the submitted data file is a video file or an image file.

8. The computer program product of claim 6, wherein the associated metadata further comprises exchangeable image file (EXIF) data.

9. The computer program product of claim 6, wherein generating a determination of the authenticity or inauthenticity of the submitted data file further comprises:

flagging characteristics in the submitted data file that indicate an inauthentic data point, comprising non-uniform pixel data or coloration;

generating a confidence score representing a percentage confidence of the authenticity or inauthenticity of the submitted data file; and based on the percentage confidence of the authenticity or inauthenticity, converting the percentage confidence to a qualitative output of likely tampered with, cannot verify, or likely authentic.

10. The computer program product of claim 6 further comprising:

an executable portion configured to upload the submitted data file to a remotely accessible datastore based on determining authenticity of the submitted data file; and an executable portion configured to transmit a link to the submitted data file to the user device.

11. A computer-implemented method for image and video authenticity verification, the method comprising:

providing a computing system comprising a computer processing device and a non-transitory computer readable medium, wherein the computer readable medium comprises configured computer program instruction code, such that when said instruction code is operated by said computer processing device, said computer processing device performs the following operations:

receive a submitted data file from a user device or entity system;

identify if the submitted data file contains associated metadata;

perform a first-pass metadata analysis and determine if the associated metadata of the submitted data file corroborates one or more known attributes of the submitted data file;

generate an initial determination of inconclusive based on the first-pass metadata analysis;

select one or more machine learning models of a machine learning dataset based on a file type of the submitted data file;

perform one or more pattern recognition processes on the submitted data file via the identified one or more machine learning models;

generate a determination of authenticity or inauthenticity of the submitted data file based on results of the one or more pattern recognition processes;

generate a unique hash value for the submitted data file based on determining authenticity of the submitted data file;

append the unique hash value to the metadata of the submitted data file;

receive the submitted data file via the secure user application on the user device;

based on receiving one or more user security verifications contemporaneous with creation of the submitted data file, automatically verify the submitted data file as authentic;

overlay a visual logo on the data file based on determining authenticity of the submitted data file, thereby generating a visually authenticated data file; and transmit the visually authenticated data file to the user device.

12. The computer-implemented method of claim 11, wherein the submitted data file is a video file or an image file.

13. The computer-implemented method of claim 11, wherein the associated metadata further comprises exchangeable image file (EXIF) data.

14. The computer-implemented method of claim 11, wherein generating a determination of the authenticity or inauthenticity of the submitted data file further comprises:

flagging characteristics in the submitted data file that indicate an inauthentic data point, comprising non-uniform pixel data or coloration;

generating a confidence score representing a percentage confidence of the authenticity or inauthenticity of the submitted data file; and based on the percentage confidence of the authenticity or inauthenticity, converting the percentage confidence to a qualitative output of likely tampered with, cannot verify, or likely authentic.

15. The computer-implemented method of claim 11, further configured to:

upload the submitted data file to a remotely accessible datastore based on determining authenticity of the submitted data file; and transmit a link to the submitted data file to the user device.

* * * * *